United States Patent [19]

Ohnhaus

[11] Patent Number: 4,677,858
[45] Date of Patent: Jul. 7, 1987

[54] DOUBLE-ACTING PITOT TUBE

[76] Inventor: Buford U. Ohnhaus, 9925 Lorelei Lane NE., Albuquerque, N. Mex. 87111

[21] Appl. No.: 839,424

[22] Filed: Mar. 13, 1986

[51] Int. Cl.[4] .............................................. G01F 1/46
[52] U.S. Cl. .................................................. 73/861.65
[58] Field of Search ........... 73/861.65, 861.66, 861.67, 73/861.68

[56] References Cited

U.S. PATENT DOCUMENTS

| | | | |
|---|---|---|---|
| 1,295,046 | 2/1919 | Lohnes | 73/861.67 |
| 1,438,811 | 12/1922 | Coyne | 73/861.65 |
| 4,047,521 | 9/1977 | Kramer et al. | 73/861.65 |

*Primary Examiner*—Herbert Goldstein
*Attorney, Agent, or Firm*—Frishauf, Holtz, Goodman & Woodward

[57] ABSTRACT

Instead of providing a channel in a Pitot tube for measuring static pressure, a channel is provided which terminates in an orifice facing perpendicular to the direction of the flow to be measured, surrounded by a rim having a surface, which may be quite narrow, that is inclined at between 15° and 45°, preferably 30°, to the plane perpendicular to the axis of the orifice, in order to intensify somewhat the Bernouilli effect of the flow across the orifice. This produces a suction (reduction of pressure) approximately equal to the increase of pressure sensed at an upstream facing orifice of a second channel produced by the same flow which is being measured. A differential manometer connected to the two channels registers about twice the pressure difference that would be measured between the pressure at an upstream facing orifice and the pressure in a channel that measures merely the static pressure in the flowing medium.

18 Claims, 6 Drawing Figures

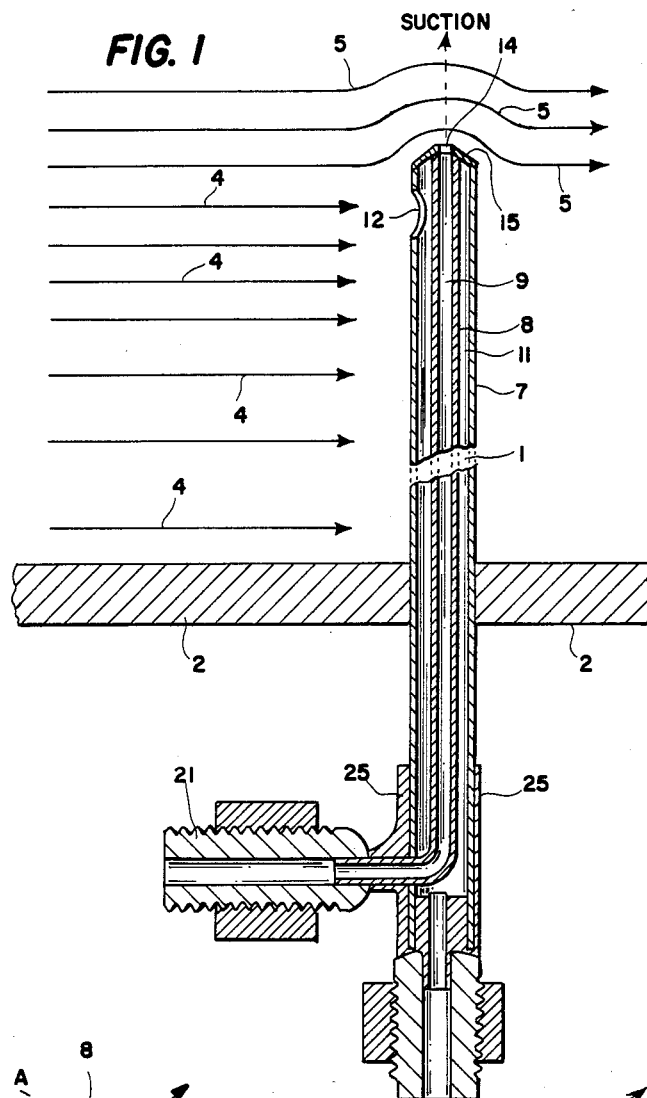
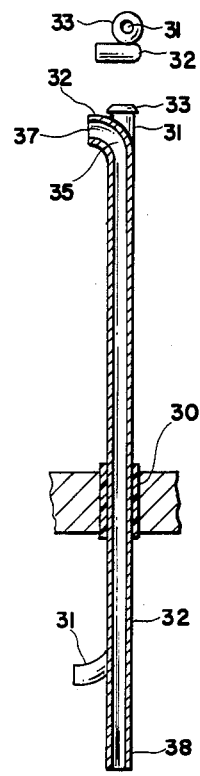
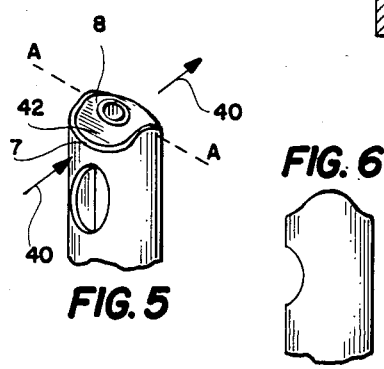
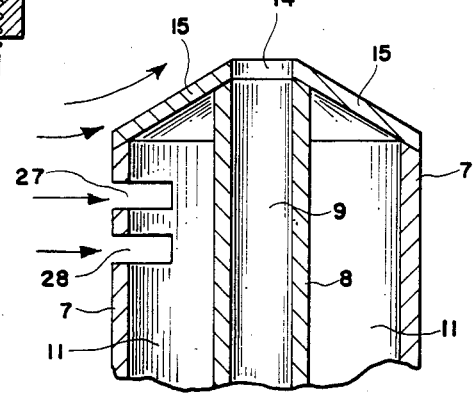

:

DOUBLE-ACTING PITOT TUBE

This invention concerns a Pitot tube for measuring fluid flow, typically flow of air or water in ducts or pipes of increased sensitivity, and particularly a Pitot tube which is easily insertable in an existing duct or pipe for measuring flow therein.

Kors et al U.S. Pat. No. 3,831,448, shows a Pitot tube of a conventional type, having concentric tubing to define a central passage having an aperture facing rearwardly in a flow to be measured near the tip of the tube and defining an annular channel having aperture facing forwards into the flow to be measured, also near the tip. The tip of the tube is closed. At the other end of the tube, outside of the pipe or duct carrying the flow to be measured, the annular channel is connected to the low pressure side of a differential manometer and the central channel is connected to the high pressure side of a differential manometer. The differential manometer subtracts the static pressure in the duct measured by the dowstream-facing orifice from the sum of the static and dynamic pressures communicated to the manometer through the upstream-facing orifice.

In recent years, compact instruments have become available for measuring the pressure difference through connections with pressure sensors on the respective channels of the Pitot tube. Although the instruments for measuring the pressure differences can now be obtained in compact form, it is desirable to increase the sensitivity of the Pitot tube itself in order to avoid the necessity of having instruments which can measure very small pressure differences.

SUMMARY OF THE INVENTION

Briefly, in order to increase the sensitivity of a Pitot tube, the measurement of the static pressure is dispensed with and, instead, for the low pressure side of the differential measurement, the low pressure channel of the Pitot tube is provided with an orifice having an axis perpendicular to the direction of flow, surrounded by a tip (rim) configuration which produces suction at the orifice of about the same magnitude as the positive dynamic pressure measured by a conventional upstream-facing orifice. This arrangement makes use of the Bernouilli effect. With a frustoconical rim surface sloping outward about 30° below the plane perpendicular to the axis of the central tube, the Bernouilli effect suction is about equal to the dynamic flow pressure detected at that upstream-facing orifice, and this relation holds over a considerable range of flow velocity. Thus, a pressure difference instrument, such as used with an ordinary Pitot tube may be used with the tube of the present invention at twice the sensitivity, for a meaning that the scale readings can be simply multiplied by two. The slope of the rim surface with respect to the plane perpendicular to the axis of the central tube should be somewhere between 15° and 45°, depending upon range of flow rates to be measured and, possibly, the diameter of the orifice of the central tube.

BRIEF DESCRIPTION OF THE DRAWINGS

The invention is further described by way of illustrative example with reference to the annexed drawings, in which:

FIG. 1 is a cross section of a double-acting Pitot tube according to the invention, schematically shown as inserted in a duct enclosing a flow of a fluid to be measured;

FIG. 2 is a detail in an enlarged scale of the tip of a Pitot tube according to the invention which corresponds to claim 1 except for the different type of opening of the annular channel to the upstream side of the Pitot tube.

FIG. 3 is a side view, partly in section of a third embodiment of the Pitot tube according to the invention;

FIG. 4 is an end view looking at the tip of the Pitot tube of FIG. 3;

FIG. 5 is a perspective view of a modified shape of tip for a concentric-channel Pitot tube, and FIG. 6 is a side view of the Pitot tube tip of FIG. 5.

DESCRIPTION OF THE ILLUSTRATED EMBODIMENTS

FIG. 1 shows a Pitot tube according to the invention shown in cross section on an enlarged scale. The tube is broken away at 1 to indicate that, on the scale of this drawing, in order to reach a flow which is free of the friction with the walls of the pipe, the tube would extend for a greater distance than shown compared with its diameter. The outer diameter of the tube could be 3 mm or somewhat smaller, or 7 mm as a typical example of a larger size.

The flow inside the pipe 2, which may be air in a ventilation duct or water in a hot water heating pipe, for example, is indicated by the arrows 4 and 5.

The Pitot tube is made up of concentric tubes 7 and 8, the inner tube 8 enclosing a central channel 9 and the outer tube 7 surrounding an annular channel 11 located between the walls of the tube 8 and 7.

The outer channel 11 is open to the flow in the pipe on the upstream side of the tube, near the tip, through a round opening 12 which is bisected by the plane of the drawing. The inner channel 9 is open at the tip of the tube structure and communicates with the flow through the orifice 14. The outer channel 11 is closed off at the tip by a frustoconical closure 15. In FIG. 1, the frustoconical closure 15 is shown as a separate unit soldered or welded onto the tip of the tubes 7 and 8, but, of course, it could also be provided in the form of an annular plug, provided that the tip surface has the necessary shape to deflect the flow around the tip in the manner shown FIG. 1 by the arrows 5. The surface of the tip from the edge of the outer tube 11 to the orifice of the central channel 9 could be rounded in profile instead of being conical as illustrated in FIGS. 1 and 2. Rounding the tip could easily be done when an annular plug molded to shape is used for the tip, but it has been found that a simple conical tip quite satisfactorily produces a Bernouilli effect suction of the correct magnitude.

Outside the pipe 2 the inner channel 9 and the outer channel 11 are brought out respectively to threaded nipples 21 and 22 for connection to a differential manometer. Following the usual arrangement for Pitot tubes, the higher pressure leg is brought out straight to the nipple 22 and the lower pressure leg is brought out at right angles to the nipple 21. A soldered or brazed shell 25 reinforces the structure where the two channels go to their separate terminations.

FIG. 2 is a detail of the tip of a Pitot tube according to the invention, showing a tip construction of the same kind as in FIG. 1 except for two slots 27 and 28 cut into the outer tube 7 to perform the function of the orifice 12 of FIG. 1.

FIG. 3 and FIG. 4 are two views of a Pitot tube of a different kind utilizing two small tubes side by side instead of in concentric arrangement. This type of Pitot tube is very simple to construct, but it does not enter as snugly into a circular hole and requires a gasket 30. The low pressure tube 31 is located behind the high pressure tube 32 as seen in FIG. 3, and the conical tip 33 is visible both in FIG. 3 and FIG. 4. The top of the tube 32 is bent as shown at 35 in order to bring the end of the tube to face upstream, as shown at 37. In FIG. 3 the connections outside the pipe containing the flow are not shown, but it is seen that the low pressure tube 31 is brought out at right angles by a bend and the higher pressure tube 32 terminates straight to its end 38. The two tubes 31 and 32 are soldered together along parts of their length. They are preferably of equal diameter.

The inclined surface of the tip 15 and of the tip 33 should, in general, have a width, measured from its inner periphery to its outer periphery, which is not less than one sixth nor more than six times the diameter of the inner channel 9 or the inner diameter of the tube 31 as the case may be.

FIG. 5 shows that it is not necessary for the tip of the Pitot tube according to the invention to be a surface of revolution, either frustoconical or rounded. In this case, the profile from the side, viewing along the line A—A of FIG. 5 which is pependicular to the direction of flow shown by the arrows 40, as shown in FIG. 6, is in the form of a flattened ridge. The center of the smooth apex of the ridge is shown by the line A—A in FIG. 5. In this case, the closure of the annular channel at the tip is provided by an annular plug 42. This arrangement makes it easy to show the shape in FIG. 5, but in practice, a plug with a shoulder fitting over a squarecut end of the outer tube 7 and providing the same tip shape flush with the end of the inner tube 8 would be easier to put together.

In practice, it is preferred to make the inner tube of the concentric tube of a diameter of from 1/32 inch to 3/32 inch with a wall thickness of about 25 mils (0.025 in.) and to use a tube of a diameter between ⅛ in. and ½ in. for the outer tube 11 of FIG. 1, with again a wall thickness of about 25 mils.

For measuring air flow, the outer diameter of the outer tube is relatively large, for example from ¼ inch or 6 mm to ½ inch or 12 mm, whereas the inner diameter of the inner tube may conveniently be 3/32 inch or 2.5 mm. For measurements of water flow it is convenient to use more slender devices, namely with an outer diameter of the outer tube of ⅛ or 3 mm and an inner diameter of the inner tube of 1/32 inch or 0.8 mm.

The improved Pitot tube of the invention lends itself well to insertion in pipes in which there is already water by using a pressure-temperature plug of known design clamped or strapped on the pipe firmly in place and then drilling a hole of the size to fit the Pitot tube through the plug and pipe wall. These are obtainable in a form that will self-seal adequately when the drill is withdrawn and allow the Pitot tube to be inserted through the desired extent for measuring flow rate and then secured in place.

For measuring the pressure difference between the two channels of the Pitot tube, in the case of water flow, where it is desirable to measure the pressure up to the pressure of a 100 inch water column, the use of a differential gauge commercially identified as "Barco" is preferred. For measuring air flow, where the pressure differences are less and may be very low, the Dwyer "Magnehelic" device, Catalog No. 2001C, has been found particularly suitable.

Two tables are given below comparing the measurements made with a double-acting Pitot tube of the present invention and a conventional Pitot tube which measures the difference between static pressure in the fluid and the sum of static and dynamic pressure, one example for measurement of air flow and one example for measurement of water flow.

EXAMPLE 1

A double-acting Pitot tube of the kind shown in FIG. 1 for measuring air flow, with an outer tube outer diameter of about ¼ inch and an inner tube inner diameter of 3/32 inch, and tube wall thickness of 25 mils in both cases, was compared with a conventional Pitot tube in which the low pressure tube measured the static pressure, using a Dwyer "Magnehelic" gauge at air flow rates from 100 to 1000 feet per second with the results given in Table I, the differential pressure being expressed in water column inches (actually small fractions of a inch).

TABLE I

| Air Speed ft. per min. | Conventional Pitot Tube | Double Acting Pitot Tube |
|---|---|---|
| 100 | 0.00063 | 0.00126 |
| 200 | 0.0025 | 0.0050 |
| 300 | 0.0057 | 0.0114 |
| 400 | 0.010 | 0.020 |
| 500 | 0.016 | 0.032 |
| 600 | 0.023 | 0.046 |
| 700 | 0.031 | 0.062 |
| 800 | 0.04 | 0.08 |
| 900 | 0.051 | 0.102 |
| 1000 | 0.063 | 0.126 |

EXAMPLE 2

A double-acting Pitot tube was used to measure water flow and compared with a conventional Pitot tube. In this case, the double-acting Pitot tube was again of a configuration shown in FIG. 1, but the tubing was much narrower. The outer diameter of the outer tube was ⅛ inch and the inner diameter of the inner tube was 0.05 inch. Comparison was made at water speeds of from 1 to 12 ft. per second as measured on the dial of a Barco differential gauge. The values in the following table are again in inches of water column.

TABLE II

| Water Speed ft. per sec. | Conventional Pitot Tube | Double Acting Pitot Tube |
|---|---|---|
| 1 | 0.39 | 0.556 |
| 2 | 1.56 | 2.2 |
| 3 | 3.51 | 5.0 |
| 4 | 6.17 | 8.7 |
| 5 | 10.2 | 14.4 |
| 6 | 13.8 | 19.5 |
| 7 | 18.8 | 26.5 |
| 8 | 24.25 | 34.2 |
| 9 | 30.9 | 43.6 |
| 10 | 38.9 | 54.9 |
| 11 | 47.1 | 66.4 |
| 12 | 55.0 | 77.6 |

The pressure difference in the measurements increases essentially as the square of the fluid flow rate. When the fluid flow rate doubles, the pressure difference quadruples.

In the measurement of air flow, over the entire range of the tabulated measurements, the pressure difference provided by the double-acting Pitot tube was exactly twice the pressure difference provided by the conventional Pitot tube. In the case of the measurement of water flow, however, the pressure differences produced by the double-acting Pitot tube were 41% higher than those produced by the conventional Pitot tube for practically the whole range, being somewhat higher only at the lowest speed measurement (one foot per second). In general, it is practical even in the case of water flow measurement to get an increase of indicated pressure difference that is at least 25% and usually well over 30% greater than the pressure difference produced by a conventional Pitot tube using the static pressure for the low pressure side of the differential pressure measurement.

Although the invention has been illustrated with respect to particular illustrative examples, it will be understood further variations and modifications are possible within the inventive concept. For example, the means for determining the difference between the pressure in the outer channel of the double-acting Pitot tube and the pressure in the inner channel thereof could comprise individual pressure sensors providing a digital electric signal output connected to a digital difference circuit providing the difference value readout.

I claim:
1. Double-acting differential fluid pressure measuring device for measuring fluid flow, comprising:
   a dual-channel elongate duct equipped for mounting in a position transverse to the direction of flow of a fluid medium into which a portion of said duct, including a first end thereof, projects when mounted in said position, said mounted position defining an upstream side of said portion of said duct, said duct having a first channel, having a straight end portion, for measuring a pressure lower than the static pressure of said medium when there is a flow of said medium in said direction and a second channel for measuring a pressure higher than the static pressure of said medium when there is a flow of said medium in said direction;
   a first orifice at said first end of said duct providing an open end for said straight end portion of said first channel facing perpendicularly to said direction of flow and terminating in a plane perpendicular to said straight end portion of said first channel, for passage of said fluid medium into and out of said first channel, said first orifice being provided with a fluid-deflecting rim surrounding said first orifice having a surface inclined to said plane perpendicular to said straight end portion of said first channel, said inclined surface having a central profile, in said direction of flow, inclined at an angle to said plane, averaged along said profile leading away from said plane to the outer periphery of said surface which is in the range from 15° to 45°;
   a second orifice on said upstream side of said duct near said first end thereof for permitting passage of said fluid medium into and out of said second channel;
   means at and near a second end of said duct, oppositely located relative to said first end, for connecting said first channel of said duct to the low-pressure sensing connection of a differential manometer having high and low pressure sensing connections and for connecting said second channel of said duct to the high pressure sensing connection of said differential manometer;
   whereby said manometer, by virtue of the position of said first orifice and the configuration and extent of said rim, measures a pressure difference representative of the rate of said flow which difference is at least 25% greater than the difference between the pressure at said high pressure sensing connection of said manometer and the static pressure of said medium in the region of the measure flow.

2. Fluid flow measuring device according to claim 1, in which said surface of said fluid-deflecting rim of said first orifice has the configuration of a frustum of a cone.

3. Fluid flow measuring device according to claim 2, in which said first channel is centered in said duct in at least said portion including said first end thereof and said second channel is annularly concentric therewith, having an outer wall which serves as outer wall for said duct, and in which the width of said surface of said rim of said first orifice extends substantially from the edge of said first orifice to said outer wall.

4. Fluid flow measuring device according to claim 3, in which said first channel is provided by an inner tube having a diameter between 1/32 and 3/32 inch and said outer wall of said second channel is a tube having a diameter in the range between ⅛ inch and ½ inch.

5. Fluid flow measuring device according to claim 1, in which said duct is constituted of a first tube and a second tube joined together side by side along large portions of their length, said first tube containing said first channel and said second tube containing said second channel.

6. Fluid flow measuring device according to claim 5, in which at or near said first end of said duct said second tube has a 90° bend leading to an open end of said tube, such that said open end of said tube faces upstream in the direction of said flow and provides said second orifice for said second channel.

7. Fluid flow measuring device according to claim 6, in which said first and second tubes are fastened together in a configuration for mounting side by side in a side by side alignment running transversely to said direction of flow.

8. Fluid flow measuring device according to claim 6, in which said first and second tubes are of equal diameter and said diameter is in the range from 1/32 inch to 3/32 inch.

9. Double-acting differential fluid pressure measuring device for measuring fluid flow, comprising
   a dual-channel elongate duct equipped for mounting in a position transverse to the direction of flow of a fluid medium into which a portion of said duct, including a first end thereof, projects when mounted in said position, said mounted position defining an upstream side of said portion of said duct, said duct having a first channel, having a straight end portion, for measuring a pressure lower than the static pressure of said medium when there is a flow of said medium in said direction and a second channel for measuring a pressure higher than the static pressure of said medium when there is a flow of said medium in said direction;
   a first orifice at said first end of said duct providing an open end for said straight end portion of said first channel facing perpendicularly to said direction of flow and terminating in a plane perpendicular to said straight end portion of said first channel, for passage of said fluid medium into and out of said first channel, said first orifice being provided with a fluid-deflecting rim surrounding said first orifice and having a surface inclined to said plane perpendicular to said straight end portion of said first channel, said inclined surface having a central profile, in said direction of flow, inclined at an angle, averaged along respective portions of said profile leading away from said plane to the outer periphery of said surface which is in the range from 15° to 45°;

a second orifice on said upstream side of said duct near said first end thereof for permitting passage of said fluid medium into and out of said second channel;

means attached and near a second end of said duct, oppositely located relative to said first end, for determining the difference between the pressure in said first channel and the pressure in said second channel.

10. Fluid flow measuring device according to claim 9, in which said surface of said fluid-deflecting rim of said first orifice has the configuration of a frustum of a cone.

11. Fluid flow measuring device according to claim 10, in which said surface of said rim, has a width measured from its inner periphery to its outer periphery, which is not less than one sixth, nor more then, six times, the diameter of said open end of said first channel.

12. Fluid flow measuring device according to claim 10, in which said first channel is centered in said duct in at least said portion including said first end thereof and said second channel is annularly concentric therewith, having an outer wall which serves as outer wall for said duct, and in which the width of said surface of said rim of said first orifice extends substantially from the edge of said first orifice to said outer wall.

13. Fluid flow measuring device according to claim 12, in which said first channel is provided by an inner tube having a diameter between 1/32 and 3/32 inch and said outer wall of said second channel is a tube having a diamter in the range between ⅛ inch and ½ inch.

14. Fluid flow measuring device according to claim 9, in which said surface of said rim has a width measured from its inner periphery to its outer periphery, which is not less than one sixth, nor more than, six times, the diameter of said open end of said first channel.

15. Fluid flow measuring device according to claim 9, in which said duct is constituted of the first tube and a second tube joined together side by side along the large portion of their length, said first tube containing said first channel and said second tube containing said second channel.

16. Fluid flow measuring device according to claim 15, in which at or near said first end of said duct said second tube has a 90° bend leading to an open end of said tube, such that said open end of said tube faces upstream in the direction of said flow and provides said second orifice for said second channel.

17. Fluid flow measuring device accoridng to claim 16, in which said first and second tubes are fastened together in a configuration for mounting side by side in a side by side alignment running transversely to said direction of flow.

18. Fluid flow measuring device according to claim 16, in which said first and second tubes are of equal diameter and said diameter is in the range from 1/32 inch to 3/32 inch.

* * * * *